(12) United States Patent
Belmont et al.

(10) Patent No.: US 8,501,148 B2
(45) Date of Patent: *Aug. 6, 2013

(54) COATING COMPOSITION INCORPORATING A LOW STRUCTURE CARBON BLACK AND DEVICES FORMED THEREWITH

(75) Inventors: James A. Belmont, Acton, MA (US); Geoffrey D. Moeser, Reading, MA (US); Andriy Korchev, Billerica, MA (US); Agathagelos Kyrlidis, Malden, MA (US); Jeremy K. Huffman, Amarillo, TX (US)

(73) Assignee: Cabot Corporation, Boston, MA (US)

( * ) Notice: Subject to any disclaimer, the term of this patent is extended or adjusted under 35 U.S.C. 154(b) by 652 days.

This patent is subject to a terminal disclaimer.

(21) Appl. No.: 12/148,920

(22) Filed: Apr. 23, 2008

(65) Prior Publication Data

US 2008/0269379 A1  Oct. 30, 2008

Related U.S. Application Data

(60) Provisional application No. 60/926,003, filed on Apr. 24, 2007, provisional application No. 60/963,815, filed on Aug. 7, 2007.

(51) Int. Cl.
| | |
|---|---|
| *C01D 3/00* | (2006.01) |
| *B41M 5/165* | (2006.01) |
| *C08L 95/00* | (2006.01) |
| *B60C 1/00* | (2006.01) |
| *C09C 1/44* | (2006.01) |

(52) U.S. Cl.
USPC .......... 423/449.1; 106/311; 106/476; 524/59; 524/495

(58) Field of Classification Search
None
See application file for complete search history.

(56) References Cited

U.S. PATENT DOCUMENTS

| | | | |
|---|---|---|---|
| 3,787,562 A | 1/1974 | Heller | |
| 3,867,513 A | 2/1975 | Krejci | |
| 3,922,335 A | 11/1975 | Jordan et al. | |
| 4,221,772 A * | 9/1980 | Eisenmenger et al. | ... 423/445 R |
| 4,444,866 A | 4/1984 | Sakai et al. | |
| 4,846,556 A | 7/1989 | Haneda | |
| 4,880,857 A | 11/1989 | Mori et al. | |
| 4,934,791 A | 6/1990 | Shimizu et al. | |
| 4,940,749 A | 7/1990 | Mori et al. | |
| 4,976,945 A * | 12/1990 | Kanamaru et al. | ............ 423/450 |

(Continued)

FOREIGN PATENT DOCUMENTS

| | | | |
|---|---|---|---|
| EP | 0420271 A1 | 4/1991 | |
| KR | 10-2005-0070947 | 7/2005 | |

(Continued)

OTHER PUBLICATIONS

Kang et al.; Characteristics of carbon-glass composite powders with spherical shape and submicron size prepared by spray pyrolysis from colloidal spray solution; Journal of the Ceramic Society of Japan; 117 [11] 1277-1280; 2009.*

(Continued)

*Primary Examiner* — Guinever Gregorio

(57) ABSTRACT

A black matrix or coating includes carbon black including a first carbon black having an $I_2$ number from 30 mg/g to 200 mg/g and a DBP from 20 cc/100 g to 45 cc/100 g.

7 Claims, 4 Drawing Sheets

U.S. PATENT DOCUMENTS

| | | | | |
|---|---|---|---|---|
| 4,994,520 | A | 2/1991 | Mori et al. | |
| 5,093,407 | A | 3/1992 | Komai et al. | |
| 5,121,237 | A | 6/1992 | Ikeda et al. | |
| 5,122,891 | A | 6/1992 | Kim | |
| 5,137,962 | A * | 8/1992 | Green | 524/496 |
| 5,164,443 | A | 11/1992 | Watanabe | |
| 5,190,739 | A | 3/1993 | MacKay | |
| 5,199,984 | A | 4/1993 | Jeong | |
| 5,214,541 | A | 5/1993 | Yamasita et al. | |
| 5,214,542 | A | 5/1993 | Yamasita et al. | |
| 5,229,452 | A | 7/1993 | Green | |
| 5,251,071 | A | 10/1993 | Kusukawa et al. | |
| 5,456,750 | A * | 10/1995 | Mackay et al. | 106/476 |
| 5,527,649 | A | 6/1996 | Sato et al. | |
| 5,573,876 | A | 11/1996 | Suzuki et al. | |
| 5,619,357 | A | 4/1997 | Angelopoulos et al. | |
| 5,639,579 | A | 6/1997 | Hayashi et al. | |
| 5,641,595 | A | 6/1997 | Hsieh et al. | |
| 5,658,697 | A | 8/1997 | Lin | |
| 5,666,177 | A | 9/1997 | Hsieh et al. | |
| 5,667,921 | A | 9/1997 | Takayanagi et al. | |
| 5,683,836 | A | 11/1997 | Deboer et al. | |
| 5,688,317 | A | 11/1997 | MacKay et al. | |
| 5,707,432 | A | 1/1998 | Adams et al. | |
| 5,714,000 | A | 2/1998 | Wellen et al. | |
| 5,718,746 | A | 2/1998 | Nagasawa et al. | |
| 5,718,992 | A | 2/1998 | Sato et al. | |
| 5,747,559 | A | 5/1998 | Whitehouse | |
| 5,782,968 | A | 7/1998 | Hirayama et al. | |
| 5,783,339 | A | 7/1998 | Watanabe et al. | |
| 5,786,042 | A | 7/1998 | Inoue et al. | |
| 5,803,959 | A | 9/1998 | Johnson et al. | |
| 5,814,434 | A | 9/1998 | Nakamura et al. | |
| 5,821,277 | A | 10/1998 | Hirayama et al. | |
| 5,837,374 | A | 11/1998 | Hirayama et al. | |
| 5,858,911 | A | 1/1999 | Wellen et al. | |
| 5,863,678 | A | 1/1999 | Urano et al. | |
| 5,866,298 | A | 2/1999 | Iwamoto et al. | |
| 5,871,706 | A | 2/1999 | Whitehouse | |
| 5,872,177 | A | 2/1999 | Whitehouse | |
| 5,877,250 | A | 3/1999 | Sant | |
| 5,877,251 | A | 3/1999 | Sant | |
| 5,880,799 | A | 3/1999 | Inoue et al. | |
| 5,885,335 | A | 3/1999 | Adams et al. | |
| 5,908,720 | A | 6/1999 | Uchikawa et al. | |
| 5,914,206 | A | 6/1999 | Takasaki et al. | |
| 5,925,484 | A | 7/1999 | Shima et al. | |
| 5,942,358 | A | 8/1999 | Ihara et al. | |
| 5,952,429 | A | 9/1999 | Ikeda et al. | |
| 5,998,090 | A | 12/1999 | Sabnis et al. | |
| 6,013,415 | A | 1/2000 | Sakurai et al. | |
| 6,057,900 | A | 5/2000 | Ono et al. | |
| 6,087,050 | A | 7/2000 | Itano et al. | |
| 6,103,432 | A | 8/2000 | Kim et al. | |
| 6,110,625 | A | 8/2000 | Wen et al. | |
| 6,114,280 | A | 9/2000 | Stephens | |
| 6,120,973 | A | 9/2000 | Itano et al. | |
| 6,132,876 | A | 10/2000 | Vogler et al. | |
| 6,140,007 | A | 10/2000 | Watanabe et al. | |
| 6,156,837 | A * | 12/2000 | Branan et al. | 524/495 |
| 6,159,645 | A | 12/2000 | Wilpert et al. | |
| 6,175,395 | B1 | 1/2001 | Yamazaki et al. | |
| 6,255,034 | B1 | 7/2001 | Shimada et al. | |
| 6,342,330 | B2 | 1/2002 | Watanabe et al. | |
| 6,358,487 | B1 | 3/2002 | Omae et al. | |
| 6,372,349 | B1 | 4/2002 | Hisashi et al. | |
| 6,375,735 | B1 | 4/2002 | Stephens et al. | |
| 6,391,274 | B1 | 5/2002 | Vogler et al. | |
| 6,413,686 | B2 | 7/2002 | Kishimoto et al. | |
| 6,417,283 | B1 | 7/2002 | Ikeda et al. | |
| 6,471,763 | B1 | 10/2002 | Karl | |
| 6,482,386 | B2 | 11/2002 | Atchetee et al. | |
| 6,617,093 | B2 | 9/2003 | Pokorny et al. | |
| 6,638,354 | B2 | 10/2003 | Stephens et al. | |
| 6,645,287 | B2 | 11/2003 | Nguyen | |
| 6,653,000 | B2 | 11/2003 | Jinbo et al. | |
| 6,720,119 | B2 | 4/2004 | Ohtsu et al. | |
| 6,734,931 | B2 | 5/2004 | Yu et al. | |
| 6,762,236 | B2 | 7/2004 | Freund | |
| 6,783,813 | B2 | 8/2004 | You et al. | |
| 6,786,958 | B2 | 9/2004 | Morita et al. | |
| 6,827,772 | B2 | 12/2004 | Foster | |
| 6,852,790 | B2 | 2/2005 | Thielen et al. | |
| 7,006,177 | B2 | 2/2006 | Hirakata et al. | |
| 7,112,618 | B2 | 9/2006 | Otto et al. | |
| 7,141,624 | B2 | 11/2006 | Bhatt et al. | |
| 7,220,307 | B2 | 5/2007 | Kano et al. | |
| 7,256,534 | B2 | 8/2007 | Koo et al. | |
| 7,267,929 | B2 | 9/2007 | Takahashi et al. | |
| 7,294,372 | B2 | 11/2007 | Cok | |
| 7,317,577 | B2 | 1/2008 | Ali et al. | |
| 7,324,278 | B2 | 1/2008 | Kuo et al. | |
| 7,426,007 | B2 | 9/2008 | Kang et al. | |
| 2001/0030821 | A1 | 10/2001 | Enokido | |
| 2003/0063238 | A1 | 4/2003 | Yi et al. | |
| 2004/0013599 | A1 * | 1/2004 | Bhatt | 423/449.1 |
| 2004/0017533 | A1 | 1/2004 | Sumino | |
| 2004/0095457 | A1 * | 5/2004 | Pokorny et al. | 347/171 |
| 2004/0157140 | A1 | 8/2004 | Kamata et al. | |
| 2005/0063893 | A1 | 3/2005 | Ayala et al. | |
| 2005/0100502 | A1 | 5/2005 | Krauss et al. | |
| 2005/0127330 | A1 | 6/2005 | Hiraoka et al. | |
| 2005/0223938 | A1 * | 10/2005 | Tyvoll | 106/31.6 |
| 2005/0247237 | A1 | 11/2005 | Schukat et al. | |
| 2005/0249657 | A1 | 11/2005 | Kutsovsky | |
| 2005/0258406 | A1 | 11/2005 | Onishi et al. | |
| 2006/0036023 | A1 | 2/2006 | Kamata et al. | |
| 2006/0041053 | A1 * | 2/2006 | Kamata et al. | 524/556 |
| 2006/0073398 | A1 | 4/2006 | Kang et al. | |
| 2006/0077336 | A1 | 4/2006 | Hirakata et al. | |
| 2006/0084751 | A1 | 4/2006 | Step | |
| 2006/0125734 | A1 | 6/2006 | Cok | |
| 2006/0132696 | A1 | 6/2006 | Chen et al. | |
| 2006/0169171 | A1 | 8/2006 | Lee et al. | |
| 2006/0204730 | A1 | 9/2006 | Nakamura et al. | |
| 2006/0264561 | A1 | 11/2006 | Green et al. | |
| 2006/0284956 | A1 | 12/2006 | Chou | |
| 2007/0002199 | A1 | 1/2007 | Fujikawa et al. | |
| 2007/0029920 | A1 | 2/2007 | Shiono et al. | |
| 2007/0101903 | A1 | 5/2007 | Lee et al. | |
| 2007/0104636 | A1 | 5/2007 | Kutsovsky | |
| 2008/0095696 | A1 * | 4/2008 | Matsushima | 423/449.1 |

FOREIGN PATENT DOCUMENTS

| | | |
|---|---|---|
| KR | 10-0560713 | 3/2006 |
| WO | WO03/057784 A2 | 7/2003 |
| WO | WO2004046244 | 6/2004 |

OTHER PUBLICATIONS

EP 0 020 889 to Degussa AG (Jan. 7, 1981)—Abstract Only.
International Search Report and Written Opinion of the International Searching Authority for PCT/US2008/005201 mailed Oct. 7, 2008.
International Search Report and Written Opinion of the International Searching Authority for PCT/US2008/005202 mailed Oct. 9, 2008.
JP07034001 to Tokai Carbon Co. Ltd. (Feb. 3, 1995)—Abstract only.
JP08262223 to Sumitomo Rubber Ind. Ltd. (Oct. 11, 1996)—Abstract only.
JP09080220 to Mitsubishi Chemical Corp. (Mar. 28, 1997)—Abstract only.
JP09095625 to Mitsubishi Chemical Corp. (Apr. 8, 1997)—Abstract only.
JP10168337 to Tokai Carbon Co. Ltd. (Jun. 23, 1998)—Abstract only.
JP10253820 to Mitsubishi Chemical Corp. (Sep. 25, 1998)—Abstract only.
JP11148026 to Tokai Carbon Co. Ltd. (Jun. 2, 1999)—Abstract only.
JP11158321 to Mikuni Shikiso KK (Jun. 15, 1999)—Abstract only.
JP11181326 to Mitsubishi Chemical Corp. (Jul. 6, 1999)—Abstract only.
JP11256066 to Tokai Carbon Co. Ltd. (Sep. 21, 1999)—Abstract only.
JP11349311 to Mitsubishi Chemical Corp. (Dec. 21, 1999)—Abstract only.
JP11080583 to Mitsubishi Chemical Corp. (Mar. 26, 1999)—Abstract only.

JP2000248195 to Tokai Carbon Co. Ltd. (Sep. 12, 2000)—Abstract only.
JP2000292615 to Mitsubishi Chemical Corp. (Oct. 20, 2000)—Abstract only.
JP2000313820 to Mitsubishi Chemical Corp. (Nov. 14, 2000)—Abstract only.
JP2001192584 to Mitsubishi Chemical Corp. (Jul. 17, 2001)—Abstract only.
JP2001200178 to Tokai Carbon Co. Ltd. (Jul. 24, 2001)—Abstract only.
JP2001207080 to Mitsubishi Chemical Corp. (Jul. 31, 2001)—Abstract only.
JP2001335720 to Tokai Carbon Co. Ltd. (Dec. 4, 2001)—Abstract only.
JP2001354873 to Mitsubishi Chemical Corp. (Dec. 25, 2001)—Abstract only.
JP2002265816 to Mitsubishi Chemical Corp. (Sep. 18, 2002)—Abstract only.
JP2002069327 to Tokai Carbon Co. Ltd. (Mar. 8, 2002)—Abstract only.
JP2002097390 to Mitsubishi Chemical Corp.; Mikuni Color Ltd. (Apr. 2, 2002)—Abstract only.
JP2003041149 to Tokai Carbon Co. Ltd. (Feb. 13, 2003)—Abstract only.
JP2003064279 to Tokai Carbon Co. Ltd. (Mar. 5, 2003)—Abstract only.
JP2003213035 to Tokai Carbon Co. Ltd. (Jul. 30, 2003)—Abstract only.
JP2003238843 to Tokai Carbon Co. Ltd. (Aug. 27, 2003)—Abstract only.
JP2004107585 to Mitsubishi Chemical Corp. (Apr. 8, 2004)—Abstract only.
JP2004163517 to Tokai Carbon Co. Ltd. (Jun. 10, 2004)—Abstract only.
JP2004168963 to Tokai Carbon Co. Ltd. (Jun. 17, 2004)—Abstract only.
JP2004196846 to Tokai Carbon Co. Ltd. (Jul. 15, 2004)—Abstract only.
JP2004269572 to Mitsubishi Chemical Corp. (Sep. 30, 2004)—Abstract only.
JP2004292672 to Mikuni Color Ltd. (Oct. 21, 2004)—Abstract only.
JP2004053726 to Tokai Carbon Co. Ltd. (Feb. 19, 2004)—Abstract only.
JP2004075985 to Mitsubishi Chemical Corp. (Mar. 11, 2004)—Abstract only.
JP2005189561 to Toyo Ink Mfg. Co. (Jul. 14, 2005)—Abstract only.
JP2005275218 to Toyo Ink Mfg. Co.; Toppan Printing Co. Ltd. (Oct. 6, 2005)—Abstract only.
JP2006003377 to Toyo Ink Mfg.Co.; Toppan Printing Co. Ltd. (Jan. 5, 2006)—Abstract only.
JP2006008820 to Tokai Carbon Co. Ltd. (Jan. 12, 2006)—Abstract only.
KR20000031558 to Korea Carbon Black Co. Ltd. (Jun. 5, 2000)—Abstract only.
KR20040043427 to Korea Engineering Plastic Co. (May 24, 2004)—Abstract only.
KR20060086526 to Gwangju Inst. of Science and Te. (Aug. 1, 2006)—Abstract only.

* cited by examiner

US 8,501,148 B2

COATING COMPOSITION INCORPORATING A LOW STRUCTURE CARBON BLACK AND DEVICES FORMED THEREWITH

This application claims priority from U.S. Provisional Applications Nos. 60/926,003, filed Apr. 24, 2007, and 60/963,815, filed Aug. 7, 2007, the contents of both of which are incorporated herein in their entirety.

BACKGROUND OF THE INVENTION

1. Field of the Invention

The present invention relates to the use of low structure carbon blacks in curable coating compositions, curable coatings, and cured coatings comprising carbon blacks, and black matrices that can be formed therefrom.

2. Description of the Related Art

Black matrix is a generic name for materials used in color displays to improve the contrast of an image by separating individual color pixels. In liquid crystal displays (LCDs), the black matrix is a thin film having high light-shielding capability and is formed between the three color elements of a color filter. In LCD's using thin film transistors (TFT), the black matrix also prevents the formation of photo-induced currents due to reflected light in the TFT.

The black matrix layer in liquid crystal displays has been manufactured by vapor deposition of Cr/CrO. Although chromium based films have excellent light-shielding capabilities, the metal vapor deposition process is expensive. In addition, chromium use and disposal is subject to increasingly restrictive environmental regulations. Chromium films also have low resistivity, which restricts the electrical design of LCDs to a subset of the possible design configurations.

Black pigments such as carbon black have been used in polymer compositions to make resistive black matrices. The structure and surface area of these blacks are chosen to permit a particular loading level of carbon black in a matrix and to reduce conductivity and charge accumulation in the media. Increased loading level increases the optical density (OD), a measure of the opacity of a material, of the media but also increases the viscosity of the coating compositions used to produce the media. Thus, it is often difficult to achieve the desired balance of overall properties. For example, while a black matrix containing a carbon black pigment could provide the required light-shielding capabilities (that is, a threshold optical density), the film might have only a modest resistivity, limiting its ability to inhibit photo-induced currents. Alternatively, if a highly resistive film were produced, the OD might be too low to be commercially viable.

Decreasing the structure of the component carbon black can decrease viscosity, allowing thinner layers of the media to be deposited without defects, or it can allow more carbon black to be incorporated at a given viscosity, resulting in a higher optical density. One method of controlling the structure of a furnace carbon black is by adding alkali or alkaline metal elements to a furnace while burning a carbonaceous feedstock. However, the resulting metal component in the carbon black can contribute to increased conductivity, and non-carbon materials in the media do not contribute to optical density. Furthermore, as potassium and other metal elements are added to the furnace, the resulting black has more charged groups on the surface and is thus more hydrophilic. Thus, a decrease in structure may come at the expense of increased conductivity and decreased optical density resulting from non-carbon elements in the carbon black. More hydrophilic or acidic blacks (e.g., pH less than 6) may not be compatible with as wide a range of polymers and other components that would be otherwise desirable for use in coating or printing applications. In addition, while optical density or tint may be increased by increasing surface area, it becomes increasingly difficult to decrease the DBP as the surface area is increased. Thus, it is desirable to develop carbon blacks having low structure but also having low amounts of alkali metals and high hydrophobicity and that do not compromise electrical properties, optical density and viscosity in compositions and devices incorporating the carbon black.

SUMMARY OF THE INVENTION

In one aspect, the invention includes a black matrix including at least a first carbon black. The first carbon black has an $I_2$ number from 30 mg/g to 200 mg/g, a DBP from 20 cc/100 g to 45 cc/100 g, and a total concentration of Group IA and IIA elements, in µg/g, of at most y+(15*$I_2$ number), wherein y is 250, 100, −50, −150, or −350. For example, the first carbon black may have a DBP value of from 20 to 45 cc/100 g, from 20 to 30 cc/100 g, from 25 to 43 cc/100 g, from 25 to 40 cc/100 g, from 30 to 39 cc/100 g, or a DBP in any range bounded by any of these endpoints. Alternatively or in addition, the first carbon black may have an iodine number ($I_2$ number) of from 30 to 200 mg/g, for example, from 30 to 45 mg/g, from 45 to 100 mg/g, from 60 to 80 mg/g, from 70 to 100 mg/g, from 100 to 150 mg/g, from 150 to 200 mg/g, 70 to 200 mg/g, or in any range bounded by any of these endpoints. The first carbon black may be characterized by at least one of the following: an M-ratio of from 1 to less than 1.25; a pH from 6 to 10; a water spreading pressure of at most 6 mJ/m$^2$; or a tint of at least 80.

In another aspect, the invention includes a black matrix including at least a first carbon black, the first carbon black having an $I_2$ number from 30 mg/g to 200 mg/g, a DBP from 20 cc/100 g to 45 cc/100 g, and a water spreading pressure of at most 6 mJ/m$^2$. For example, the first carbon black may have a DBP value of from 20 to 45 cc/100 g, from 20 to 30 cc/100 g, from 25 to 43 cc/100 g, from 25 to 40 cc/100 g, from 30 to 39 cc/100 g, or a DBP in any range bounded by any of these endpoints. Alternatively or in addition, the first carbon black may have an iodine number ($I_2$ number) of from 30 to 200 mg/g, for example, from 30 to 45 mg/g, from 45 to 100 mg/g, from 60 to 80 mg/g, from 70 to 100 mg/g, from 100 to 150 mg/g, from 150 to 200 mg/g, 70 to 200 mg/g, or in any range bounded by any of these endpoints. The first carbon black may be characterized by at least one of the following: an M-ratio of from 1 to less than 1.25; a pH from 6 to 10; a total concentration of Group IA and IIA elements, in µg/g, of at most y+(15*$I_2$ number), wherein y is 250, 100, −50, −150, or −350; or a tint of at least 80.

In another aspect, the invention includes black matrix including at least a first carbon black, the first carbon black having an $I_2$ number from 30 mg/g to 200 mg/g, a DBP from 20 cc/100 g to 45 cc/100 g, and a pH from 6 to 10. For example, the first carbon black may have a DBP value of from 20 to 45 cc/100 g, from 20 to 30 cc/100 g, from 25 to 43 cc/100 g, from 25 to 40 cc/100 g, from 30 to 39 cc/100 g, or a DBP in any range bounded by any of these endpoints. Alternatively or in addition, the first carbon black may have an iodine number ($I_2$ number) of from 30 to 200 mg/g, for example, from 30 to 45 mg/g, from 45 to 100 mg/g, from 60 to 80 mg/g, from 70 to 100 mg/g, from 100 to 150 mg/g, from 150 to 200 mg/g, 70 to 200 mg/g, or in any range bounded by any of these endpoints. The first carbon black may be characterized by at least one of the following: a total concentration of Group IA and IIA elements, in µg/g, of at most y+(15*$I_2$ number), wherein y is 250, 100, −50, −150, or −350; an M-ratio of from 1 to less than 1.25; a water spreading pressure of at most 6 mJ/m$^2$; or a tint of at least 80.

In another aspect, the invention includes a black matrix including at least a first carbon black, the first carbon black having an I$_2$ number from 30 mg/g to 200 mg/g, a DBP from 20 cc/100 g to 45 cc/100 g, and an M-ratio of from 1 to less than 1.25. For example, the first carbon black may have a DBP value of from 20 to 45 cc/100 g, from 20 to 30 cc/100 g, from 25 to 43 cc/100 g, from 25 to 40 cc/100 g, from 30 to 39 cc/100 g, or a DBP in any range bounded by any of these endpoints. Alternatively or in addition, the first carbon black may have an iodine number (I$_2$ number) of from 30 to 200 mg/g, for example, from 30 to 45 mg/g, from 45 to 100 mg/g, from 60 to 80 mg/g, from 70 to 100 mg/g, from 100 to 150 mg/g, from 150 to 200 mg/g, 70 to 200 mg/g, or in any range bounded by any of these endpoints. The first carbon black may be characterized by at least one of the following: a concentration of Group IA and IIA elements, in μg/g, of at most y+(15*I$_2$ number), wherein y is 250, 100, −50, −150, or −350; a pH from 6 to 10; a water spreading pressure of at most 6 mJ/m$^2$; or a tint of at least 80.

In any of the above embodiments, the carbon black may have a tint obeying the equation tint=x+0.44*I$_2$ number, where x is from 45 to 90, for example, from 60 to 90 or 75 to 90. The black matrix may include at least 50% by weight of carbon black, for example, at least 55% by weight of carbon black, from 50% to 80% by weight of carbon black, from 55% to 80% by weight of carbon black, or 60% to 80% by weight of carbon black. The black matrix may have an optical density of at least 3, for example, at least 4, at a 1 micron thickness. The black matrix may have a surface resistivity of at least 10$^{12}$ ohm/square at a carbon black loading of at least 60%.

In any of the above embodiments, the black matrix may include a second carbon black. The second carbon black may differ from the first carbon black in one or more of surface area, structure, primary particle size, alkali and/or alkaline earth concentration, pH, Spectronic 20 value, tint, or a surface concentration of oxygen-containing groups. The second carbon black may be an oxidized carbon black, a heat treated carbon black, or a modified carbon black comprising an attached organic group.

In another aspect, the invention includes a curable coating composition including a vehicle, a curable resin, and at least a first carbon black. The first carbon black has an I$_2$ number from 30 mg/g to 200 mg/g, a DBP from 20 to 45 cc/100 g, and a concentration of Group IA and IIA elements, in μg/g, of at most y+(15*I$_2$ number), wherein y is 250, 100, −50, −150, or −350. For example, the first carbon black may have a DBP value of from 20 to 45 cc/100 g, from 20 to 30 cc/100 g, from 25 to 43 cc/100 g, from 25 to 40 cc/100 g, from 30 to 39 cc/100 g, or a DBP in any range bounded by any of these endpoints. Alternatively or in addition, the first carbon black may have an iodine number (I$_2$ number) of from 30 to 200 mg/g, for example, from 30 to 45 mg/g, from 45 to 100 mg/g, from 60 to 80 mg/g, from 70 to 100 mg/g, from 100 to 150 mg/g, from 150 to 200 mg/g, 70 to 200 mg/g, or in any range bounded by any of these endpoints. The first carbon black may be characterized by at least one of the following: an M-ratio of from 1 to less than 1.25; a pH from 6 to 10; a water spreading pressure of at most 6 mJ/m$^2$; or a tint of at least 80. The carbon black may have a tint obeying the equation tint=x+0.44*I$_2$ number, where x is from 45 to 90, for example, from 60 to 90 or 75 to 90. When the curable coating composition has a carbon black loading of at least 50% by weight, it may exhibit Newtonian flow. The curable coating composition may have a carbon black loading of at least 20 weight %, at least 30 weight %, at least 40 weight %, at least 45 weight %, at least 50 weight %, at least 55 weight %, or at least 60 weight %.

In another aspect, the invention includes a coating including a resin, optional dispersant, and at least a first carbon black, the first carbon black having an I$_2$ number from 25 mg/g to 200 mg/g, a DBP from 20 to 45 cc/100 g, and a concentration of Group IA and IIA elements, in μg/g, of at most y+(15*I$_2$ number), wherein y is 250, 100, −50, −150, or −350. For example, the first carbon black may have a DBP value of from 20 to 45 cc/100 g, from 20 to 30 cc/100 g, from 25 to 43 cc/100 g, from 25 to 40 cc/100 g, from 30 to 39 cc/100 g, or a DBP in any range bounded by any of these endpoints. Alternatively or in addition, the first carbon black may have an iodine number (I$_2$ number) of from 30 to 200 mg/g, for example, from 30 to 45 mg/g, from 45 to 100 mg/g, from 60 to 80 mg/g, from 70 to 100 mg/g, from 100 to 150 mg/g, from 150 to 200 mg/g, 70 to 200 mg/g, or in any range bounded by any of these endpoints. When the coating includes 60 weight percent of carbon black, it may have a surface electrical resistivity of at least 10$^{12}$ ohm/square. The first carbon black may be characterized by at least one of the following: an M-ratio of from 1 to less than 1.25; a pH from 6 to 10; a water spreading pressure of at most 6 mJ/m$^2$; or a tint of at least 80. The first carbon black may have a tint obeying the equation tint=x+0.44*I$_2$ number, where x is from 45 to 90, for example, from 60 to 90 or 75 to 90. The coating may have an optical density of at least 3, for example, at least 4, at a 1 micron thickness. The coating may include at least 50% by weight of carbon black, for example, at least 55% by weight of carbon black, from 50% to 80% by weight of carbon black, from 55% to 80% by weight of carbon black, or 60% to 80% by weight of carbon black.

In another aspect, the invention includes millbase including at least 20 weight percent carbon black including a first carbon black, a vehicle, and an optional dispersant. The first carbon black has an I$_2$ number from 30 mg/g to 200 mg/g, a DBP from 20 to 45 cc/100 g, and a concentration of Group IA and IIA elements, in μg/g, of at most y+(15*I$_2$ number), wherein y is 250, 100, −50, −150, or −350. For example, the first carbon black may have a DBP value of from 20 to 45 cc/100 g, from 20 to 30 cc/100 g, from 25 to 43 cc/100 g, from 25 to 40 cc/100 g, from 30 to 39 cc/100 g, or a DBP in any range bounded by any of these endpoints. Alternatively or in addition, the first carbon black may have an iodine number (I$_2$ number) of from 30 to 200 mg/g, for example, from 30 to 45 mg/g, from 45 to 100 mg/g, from 60 to 80 mg/g, from 70 to 100 mg/g, from 100 to 150 mg/g, from 150 to 200 mg/g, 70 to 200 mg/g, or in any range bounded by any of these endpoints. The first carbon black may characterized by at least one of the following: an M-ratio of from 1 to less than 1.25; a pH from 6 to 10; a water spreading pressure of at most 6 mJ/m$^2$; or a tint of at least 80. The carbon black may have a tint obeying the equation tint=x+0.44*I$_2$ number, where x is from 45 to 90, for example, from 60 to 90 or 75 to 90. When the millbase is formulated with 50% by weight carbon black, the millbase may be a Newtonian fluid. The millbase may include at least 30 weight %, at least 40 weight %, at least 45 weight %, at least 55 weight %, or at least 60 weight %, for example, from 50 weight % to 80 weight % or from 60 weight % to 80 weight % of carbon black, or any amount of carbon black in any range bounded by any of these endpoints.

It is to be understood that both the foregoing general description and the following detailed description are exemplary and explanatory only and are intended to provide further explanation of the present invention, as claimed.

DETAILED DESCRIPTION OF THE INVENTION

Figure 1:
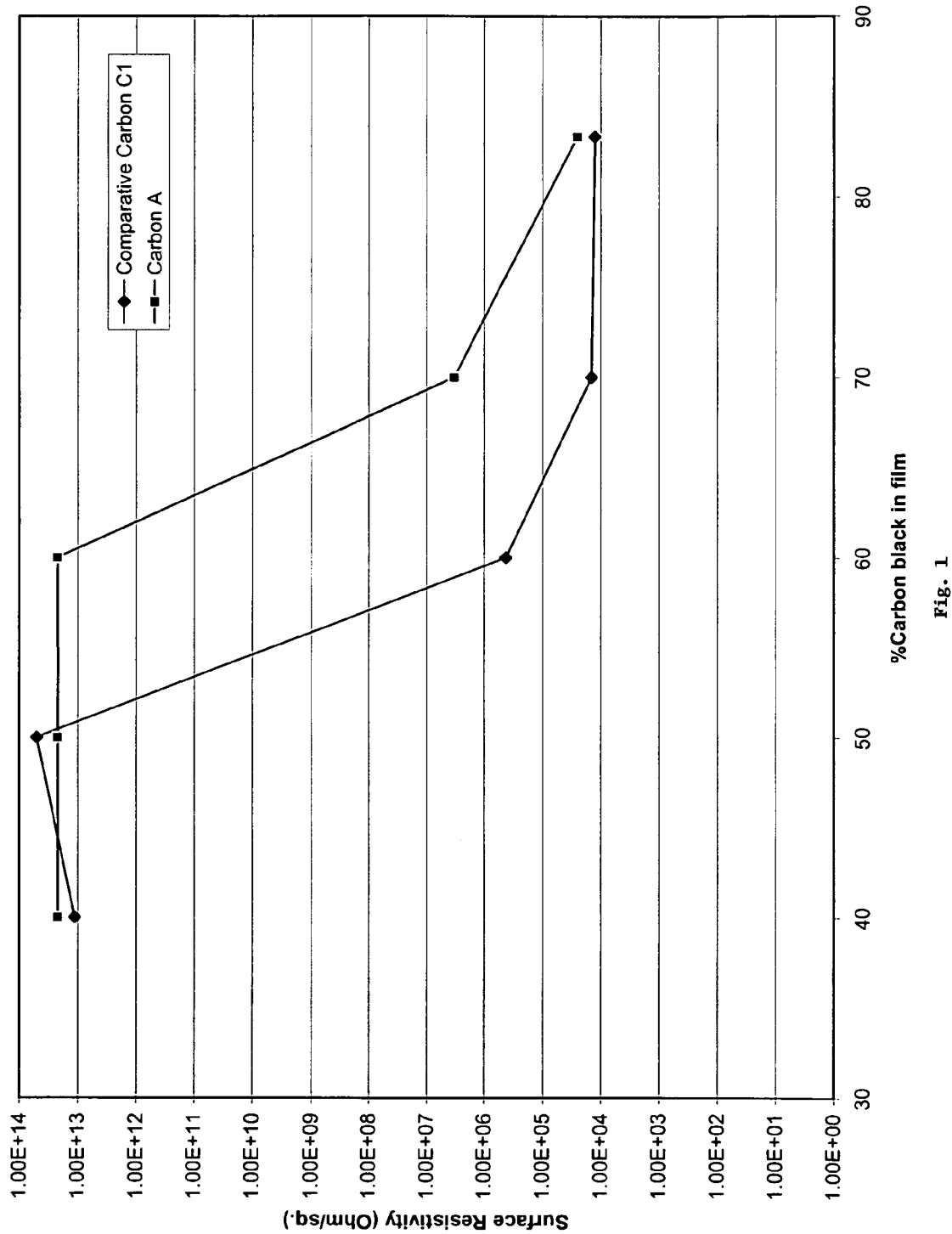
FIG. 1 is a graph showing the percolation curves for a carbon black for use according to an exemplary embodiment of the invention and a commercially available carbon black.

We have surprisingly found that coatings including a resin and at least one carbon black having a low level of structure, e.g., a DBP of 20 cc/100 g to 45 cc/100 g, can be produced with higher loadings of carbon black while exhibiting improved electrical properties compared to coatings comprising the same resin and more highly structured carbon blacks. Furthermore, we have unexpectedly found that low structure, high surface area blacks allow the production of coatings and black matrices with high carbon black loadings while maintaining control of resistivity.

In one embodiment, a black matrix according to the invention includes at least a first carbon black, the first carbon black having a dibutylphthalate absorption (DBP) value, a measure of the structure or branching of a pigment, from 20 cc/100 g to 45 cc/100 g and an iodine number from 30 mg/g to 200 mg/g.

In certain embodiments, the first carbon black employed in the black matrix composition and in other embodiments of the invention described elsewhere herein may have a DBP value of from 20 to 45 cc/100 g, from 20 to 30 cc/100 g, from 25 to 43 cc/100 g, from 25 to 40 cc/100 g, from 30 to 39 cc/100 g, or a DBP in any range bounded by any of these endpoints. The carbon black primary particles may approach an essentially overall spherical geometry, although carbon particles having other shapes, such as needles and plates, may also be used.

The first carbon black employed in the black matrix composition and in other embodiments of the invention described elsewhere herein may have any of a wide range of surface areas depending on the desired properties of the carbon black. For example, the carbon black may have an iodine number ($I_2$ number) of from 30 to 200 mg/g, for example, from 30 to 45 mg/g, from 45 to 100 mg/g, from 60 to 80 mg/g, from 70 to 100 mg/g, from 100 to 150 mg/g, from 150 to 200 mg/g, 70 to 200 mg/g, or in any range bounded by any of these endpoints. As known to those skilled in the art, at fixed porosity, increased surface area correlates with smaller primary particle size.

The first carbon black employed in any of the embodiments of this invention may additionally have one or more of the following properties, each of which is discussed in more detail below. The carbon black may have a total concentration of alkali and alkaline earth elements (e.g., Group IA and IIA elements) in µg/g, of at most (y+15*$I_2$ number), where y is 250, 100, −50, −150, or −350. The M-ratio, the ratio of the median Stokes diameter to the mode of the Stokes diameter of a carbon black sample, may be from 1.0 to less than 1.25, for example, between 1.22 and 1.24 or in any range defined by any of these endpoints. The carbon black may have a tint of at least 80. The tint of the carbon black may be defined by the following equation:

$$\text{Tint} = x + 0.44 * I_2 \text{ number}$$

where x may be from 45 to 90, for example, from 60 to 90 or from 75 to 90. The carbon black may have a pH from 6 to 10, for example, from 6 to 8, from 8 to 10, from 7 to 9, or in any range defined by any of these endpoints. The water spreading pressure (WSP), a measure of the interaction energy between the carbon black surface and water vapor, may be at most 6 mJ/m², for example, at most 5 mJ/m², at most 4 mJ/m², from 2 to 6 mJ/m², from 2 to 5 mJ/m² from 3 to 6 mJ/m², from 3 to 5 mJ/m², or in any range defined by any of these endpoints.

In general, the loading level of a specific carbon black affects the surface resistivity of a coating containing that carbon black. Initially, at low loadings, the surface resistivity remains substantially constant with increasing amounts of carbon black. At higher levels, a transition occurs in which enough carbon black is present that a substantial decrease in resistivity occurs. This is often referred to as the percolation threshold. Levels of carbon black in excess of this threshold have very little effect on the resistivity of the coating. Many carbon blacks exhibit similar percolation performance. Thus, carbon black percolation curves are very similar, regardless of the type of carbon black, with the exception that the percolation point (i.e., the loading of carbon black at which the surface resistivity decreases) is different. This is shown by a shifting of the percolation curve. FIG. 1 shows percolation curves for two different coatings produced with the same resin but different carbon blacks. The percolation curves have a shape that is common for carbon black, with two relative plateaus connected by a relatively steep transition region.

For some applications, the target surface resistivity may fall on the steepest point of the percolation curve. From a practical perspective, manufacturing this coating would require tight controls on the carbon black loading since small changes in loading would have a large effect on the observed resistivity.

Without being bound by any particular theory, it is believed that the low structure of the carbon blacks exploited in various embodiments of the invention may enable higher packing efficiency of the carbon black. Lower structure carbon blacks are geometrically able to pack more densely than higher structure carbon black particles, as measured by their DBP oil absorption, which is an effective measure of their packed pore volume. As a result, in certain embodiments of the present invention, the percolation curve may be shifted such that a preselected resistivity may occur away from the steepest part of the curve. Thus, small changes in loading do not have a large effect on resistivity.

The ability to increase carbon black loading provides other benefits to materials such as toners, inks, black matrix, photoresist, and millbases used to prepare these and other products. The performance of the millbase and photoresist depend on the content of carbon black. As the carbon black concentration is increased, properties such as curability, developability, patternability, and adhesion to glass are affected. In many cases, one of these properties limits the upper concentration of carbon black that is acceptable in the coating, which in turn imposes an upper limit on the achievable optical density of the film. Exploiting low structure carbon blacks according to certain embodiments of the invention allows the preparation of films with higher loading of carbon black while maintaining the balance of properties required for performance as a black matrix. Since the optical density of the film is proportional to its carbon black content, we expect that these films formulated at maximum carbon loading will have comparatively higher optical density than films prepared with conventional carbon black.

Moreover, we have unexpectedly found that dispersions prepared with increased concentrations of low structure, high surface area carbon blacks have relatively lower viscosity than dispersions prepared with either higher structure or lower surface area blacks. This improves the manufacturability of various devices. Indeed, we have found that these dispersions retain Newtonian flow characteristics at higher loadings than dispersions with higher structure or lower surface area blacks. The reduced viscosity improves the leveling of coating compositions, reducing irregularities in the final coating and increasing smoothness. In addition, thinner coatings may be deposited without the risk of pinholes or other defects.

We have unexpectedly discovered that use of carbon black having an M-ratio less than 1.25 increases the optical density of materials into which the carbon black is incorporated with respect to carbon blacks having the same structure and surface area but higher M-ratios. This allows lesser quantities of carbon black to be used to obtain a given optical density, reducing the viscosity of millbases and other fluid media containing the carbon black that are used to produce such materials. Increased tint decreases the amount of carbon black that must be used in a carrier to achieve a desired optical density.

Carbon blacks having a neutral pH or slightly basic pH rather than an acidic pH may be more compatible with certain polymers and other materials that can be used to produce black matrix, coatings, millbases, inks, toners, and other media, expanding the range of compositions that may be combined with carbon black for these applications. In addition, such carbon blacks will interact differently with the alkaline developers typically employed in the production of black matrix than acidic carbon blacks and may improve the development characteristics of resists, black matrices, and other coatings employing alkaline developers.

Carbon blacks having a lower quantity of alkali and alkaline earth elements may exhibit lower conductivity and/or provide higher optical density to media into which they are incorporated.

Lower WSP represents more hydrophobic carbon black. Carbon blacks with low water spreading pressures, e.g., more hydrophobic carbon blacks, may be more compatible with certain polymers and other materials that can be used to produce black matrix, millbases, coatings, inks, toners, and other materials, expanding the range of compositions that may be combined with carbon black for these applications. In addition, such carbon blacks will interact differently with the alkaline developers typically employed in the production of black matrix and resist coatings than more hydrophilic carbon blacks and may improve the development characteristics of resists, black matrices, and other coatings employing alkaline developers.

It has surprisingly been found that millbases, dispersions, curable coating compositions, and coatings such as black matrix may be prepared with relatively high levels, e.g., at least 40%, at least 50%, at least 55%, or at least 60% of carbon blacks such as those described herein. This enables the preparation of coatings and black matrices having improved overall properties, including an improved balance of electrical properties such as surface resistivity, and optical density. Surface resistivity is a measure of the ability of a material to prevent the conduction of electricity and can be measured using a variety of techniques known in the art. Optical density is typically measured using an optical densitometer. OD is dependent on several factors, including the thickness of the film.

Carbon blacks such as those described herein may be combined with a vehicle and a curable resin to form a curable coating composition. The curable coating composition may be formed using any method known to those skilled in the art, including, for example, using high shear mixing. Furthermore, the compositions may be prepared using a dispersion of carbon black in a vehicle, such as a millbase. Such a millbase may have at least 20 weight percent, for example, at least 30 weight percent, of carbon black including a carbon black such as those described herein. When the millbase includes 50 weight percent carbon black, it may be a Newtonian fluid. Preferably, there is sufficient resin in the cured coating to substantially fill the void volume defined by the shape of the carbon black aggregates.

The vehicle may be either an aqueous vehicle or a non-aqueous vehicle. Examples include non-aqueous vehicles including one or more of butanol (e.g., one or more of n-butanol, sec-butanol, tert-butanol, and isobutanol), 2-heptanone, butyl acetate, ethylcellosolve, ethylcellosolve acetate, butylcellosolve, butylcellosolve acetate, ethylcarbitol, ethylcarbitol acetate, diethyleneglycol, cyclohexanone, propyleneglycol monomethylether, propyleneglycol monomethylether acetate, lactate esters, dimethyl formamide, methyl ethyl ketone, dimethylacetamide, and mixtures thereof. Aqueous solvents may also be added, including, for example, water and water soluble alcohols.

The curable resin may be any resin known in the art. For example, the resin may be an epoxy bisphenol-A resin or an epoxy novolac resin. The resin may also be an acrylic resin, a polyimide resin, a urethane resin, a polyester resin, or a gelatin. The resin may be cured by any of a variety of known methods, including, for example, thermally or by any source of radiation such as, for example, infrared or ultraviolet radiation. The curable coating composition may be photosensitive (i.e. may be cured by irradiation) or thermosensitive (i.e., may be cured by changing temperature, such as by heating). When the resin is curable by irradiation, the curable coating composition may further include a photoinitiator, which generates a radical on absorbing light with the respective pigment.

The curable coating composition or millbase may be formed with a minimum of additional components (additives and/or cosolvents) and processing steps. However, additives such as dispersants and cosolvents may also be included. For example, when a photosensitive resin is used, such as epoxy bisphenol-A or epoxy novolak, a photoinitiator can also be added. Other curable monomers and/or oligomers may also be added.

In a further embodiment, a curable coating is prepared from the curable coating composition. The curable coating may include a curable resin and at least one carbon black. The curable resin and the carbon black can be any of those described in more detail above. The curable coating can be a photosensitive coating from which a cured coating may be fabricated by irradiating the curable coating, or a thermosensitive coating, from which a cured coating is fabricated by thermal treatment of the curable coating.

In another embodiment, a cured coating is prepared from the curable coating composition. The cured coating may include a resin, an optional dispersant, and at least one carbon black such as any of those described herein. When the coating includes at least 60 weight percent of carbon black, the surface electrical resistivity may be at least $10^{12}$ ohm/square, for example, $10^{13}$ ohm/square. The coating, for example, a black matrix, may further may have an optical density of greater than or equal to 3, preferably greater than or equal to 4, and more preferably greater than or equal to 5, for example, between 3.5 and 10, at a 1 micron thickness. The coatings may have similar electrical properties (such as resistivity) at greater film thicknesses, including, for example, 10-100 micron thickness, depending on the application of the coating.

The present invention further relates to a black matrix that may be used in, for example, a color filter in a liquid crystal display device. The black matrix can be formed using any method known in the art. For example, the black matrix may be formed by applying a curable coating composition comprising a first carbon black onto a substrate, curing the resulting curable coating imagewise to produce a cured coating, and developing and drying the cured coating. For example, the black matrix may be prepared from the curable coating composition, curable coating, and/or the cured coating of the present invention, each of which is described in more detail above.

Surface resistivity and optical density are important properties for black matrix materials, and are described in more detail above. Since the black matrices according to certain embodiments of the present invention may be formed from the curable coating compositions of the present invention, which are used to form a cured coating of the present invention, the black matrix can have the performance properties (surface resistivity and optical density) described above in relationship to the coating. In addition, carbon black may be selected with a specific DBP to attain particular desired overall performance attributes.

Performance of the various media described above will depend on a variety of factors. For example, it has surprisingly been found that coatings comprising a resin and a first carbon black may be produced with higher carbon black loadings while maintaining high resistivity, even when the first carbon black has not been subjected to additional surface modification. In certain embodiments, it may be desirable to optimize optical density, carbon black loading, surface resistivity, smoothness, and other performance requirements.

Coatings and black matrices according to various embodiments of the invention may also be produced using blends of carbon blacks. For example, carbon black blends may include a first carbon black and a second carbon black with different primary particle sizes. The difference between the two particle sizes may be from 1 nm to 25 nm, for example, from 5 nm to 25 nm. The smaller particles may fit in the interstices between larger carbon black particles. One of skill in the art will recognize that, for a given sample of carbon black, the particle size will actually exhibit a distribution of sizes about the specified size. In another embodiment, carbon blacks having different surface compositions, surface areas, levels of structure, concentrations of metal elements, pH values, or Spectronic 20 values may be blended. For example, carbon blacks that have not been modified to attach an organic group to the surface or have been oxidized or subjected to heat treatment, e.g., to increase the graphite content of the carbon black, may be combined with carbon blacks that have been subjected to such modification.

We have identified operating conditions that permit low structure carbon blacks to be produced with high surface areas but with lower amounts of Group IA and Group IIA metal elements than have been previously used, thereby reducing the amount of these metals in the carbon black product. In general, for a carbon black having a given surface area, the structure can only be depressed to a certain amount by addition of metal elements, after which further metal element addition does not further influence structure. However, we have produced carbon blacks having significantly lower structure, e.g., a dibutylphthalate absorption (DBP) value of 20 cc/100 g to 45 cc/100 g, than has been previously achievable for intermediate surface area blacks, not to mention high surface area blacks. Exemplary apparatus and reaction conditions are described below and in the Examples. Carbon blacks for use according to various embodiments of the invention may also be produced using a variety of other apparatus, including those described in, for example, U.S. Pat. Nos. 5,456,750, 4,391,789; 4,636,375; 6,096,284; and 5,262,146. One of skill in the art will recognize how to adapt the reaction conditions described below to produce carbon blacks for use according to the various embodiments of the invention in other apparatus.

Figure 2:
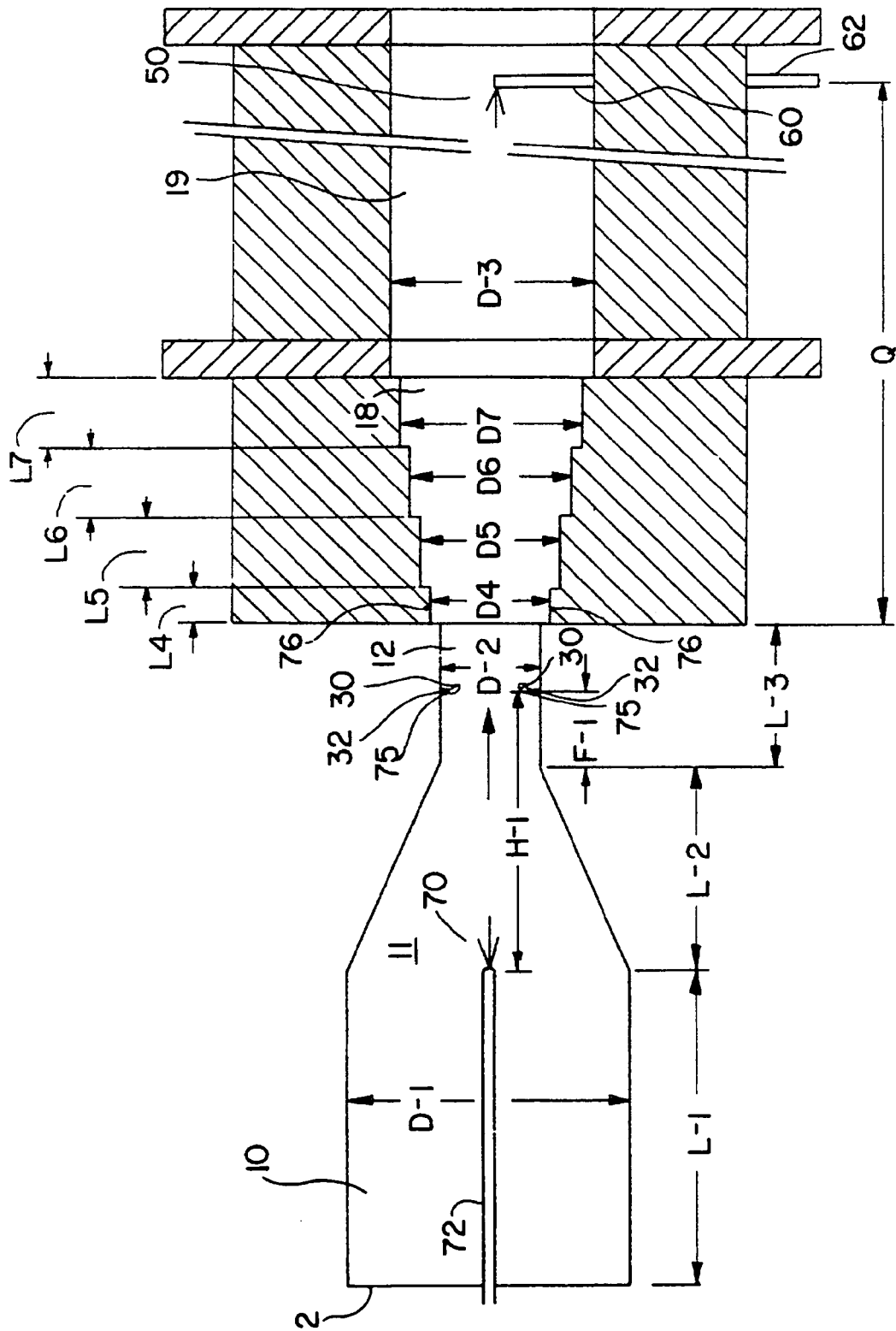
FIG. 2 is a cross-sectional view of a portion of one type of furnace carbon black reactor that may be utilized to produce carbon blacks for use in exemplary embodiments of the invention.

In one embodiment, carbon blacks are produced in a modular furnace carbon black reactor 2, such as that depicted in FIG. 2, having a combustion zone 10, which has a zone of converging diameter 11, transition zone 12, entry section 18, and reaction zone 19. The diameter of the combustion zone 10, up to the point where the zone of converging diameter 11 begins, is shown as D-1; the diameter of zone 12, as D-2; the diameters of the stepped entry section, 18, as D-4, D-5, D-6, and D-7; and the diameter of zone 19, as D-3. The length of the combustion zone 10, up to the point where the zone of converging diameter 11 begins, is shown as L-1; the length of the zone of converging diameter is shown as L-2; the length of the transition zone is shown as L-3; and the lengths of the steps in the reactor entry section, 18, as L-4, L-5, L-6 and L-7.

To produce carbon blacks, hot combustion gases are generated in combustion zone 10 by contacting a liquid or gaseous fuel with a suitable oxidant stream such as air, oxygen, mixtures of air and oxygen or the like. Among the fuels suitable for use in contacting the oxidant stream in combustion zone 10 to generate the hot combustion gases are any of the readily combustible gas, vapor, or liquid streams such as natural gas, hydrogen, carbon monoxide, methane, acetylene, alcohol, or kerosene. It is generally preferred, however, to utilize fuels having a high content of carbon-containing components and in particular, hydrocarbons. The volumetric ratio of air to natural gas utilized to produce the carbon blacks of the present invention may preferably be from about 10:1 to about 100:1. To facilitate the generation of hot combustion gases, the oxidant stream may be preheated. In some embodiments, the overall combustion ratio is at least 26%, for example, at least 30% or at least 35%.

The hot combustion gas stream flows downstream from zones 10 and 11 into zones 12, 18, and 19. The direction of the flow of hot combustion gases is shown in the figure by the arrow. Carbon black-yielding feedstock 30 is introduced at point 32 (located in zone 12), and/or at point 70 (located in zone 11). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like.

The distance from the end of the zone of converging diameter 11 to point 32 is shown as F-1. Generally, carbon black-yielding feedstock 30 is injected in the form of a plurality of streams which penetrate into the interior regions of the hot combustion gas stream to insure a high rate of mixing and shearing of the carbon black-yielding feedstock by the hot combustion gases so as to rapidly and completely decompose and convert the feedstock to carbon black.

Auxiliary hydrocarbon is introduced at point 70 through probe 72 or through auxiliary hydrocarbon passages 75 in the walls which form the boundaries of zone 12 of the carbon black forming process or through auxiliary hydrocarbon passages 76 in the walls which form the boundaries of zones 18 and/or 19 of the carbon black forming process. The term "auxiliary hydrocarbon" as used herein refers to hydrogen or any hydrocarbon having a molar hydrogen-to-carbon ratio greater than the molar hydrogen-to-carbon ratio of the feedstock and may be gaseous or liquid. Exemplary hydrocarbons include but are not limited to those materials described herein as suitable for use as fuels and/or feedstocks. In certain embodiments of the invention, the auxiliary hydrocarbon is natural gas. The auxiliary hydrocarbon may be introduced at any location between the point immediately after the initial combustion reaction of the first-stage fuel and the point immediately before the end of formation of carbon black provided that unreacted auxiliary hydrocarbon eventually enters the reaction zone. In certain preferred embodiments, the auxiliary hydrocarbon is introduced in the same axial plane as the feedstock. In the Examples described below, the auxiliary hydrocarbon was introduced through three orifices in the same axial plane as the carbon black yielding feedstock streams. The orifices are preferably arranged in an alternating pattern, one feedstock, the next auxiliary hydrocarbon, etc., spaced evenly around the outer periphery of section 12. The quantity of auxiliary hydrocarbon added to the reactor may be adjusted so that carbon content of the auxiliary hydrocarbon is less than about 20% by weight of the total carbon content of all fuel streams injected into the reactor, for example, from about 1 to about 5%, from about 5% to about 10%, from about 10% to about 15%, from about 15% to about 20%, or in any range defined by any of these endpoints. In certain preferred embodiments, the carbon content of the auxiliary hydrocarbon is from about 3% to about 6% by weight of the total carbon content of all fuel streams injected into the reactor.

The distance from point 32 to point 70 is shown as H-1.

In some embodiments, specific alkali or alkaline earth materials are added to the carbon black as a structure modifier in such an amount that the total concentration in the resulting carbon black of alkali or alkaline earth materials is low. Preferably, the substance contains at least one alkali metal or alkaline earth metal. Examples include lithium, sodium, potassium, rubidium, cesium, francium, calcium, barium, strontium, or radium, or any combination of two or more of these. The substance can be a solid, solution, dispersion, gas, or any combination thereof. More than one substance having the same or different Group IA or Group IIA element can be used. If multiple substances are used, the substances can be added together, separately, sequentially, or in different reaction locations. For purposes of the present invention, the substance can be the metal (or metal ion) itself, a compound containing one or more of these elements, including a salt containing one or more of these elements, and the like. Exemplary salts include both organic and inorganic salts, for example, salts, e.g., of sodium and/or potassium, with any of chloride, acetate, or formate, or combinations of two or more such salts. Preferably, the substance is capable of introducing a metal or metal ion into the reaction that is ongoing to form the carbon black product. For instance, the substance can be added at any point prior to the complete quenching, including prior to the introduction of the carbon black yielding feedstock in the first stage; during the introduction of the carbon black yielding feedstock in the first stage; after the introduction of the carbon black yielding feedstock in the first stage; prior to, during, or immediately after the introduction of the auxiliary hydrocarbon; or any step prior to complete quenching. More than one point of introduction of the substance can be used. The amount of the metal-containing substance can be any amount as long as a carbon black product can be formed. As described above, the amount of the substance can be added in an amount such that the total amount of Group IA and/or Group IIA elements (i.e., the total concentration of Group IA and Group IIA elements contained the carbon black) in μg/g is at most $$y + 15 * I_2 \text{ number}$$

where y may be 250, 100, −50, −200, or −350. In certain embodiments, the substance introduces a Group IA element; for example, the substance may introduce potassium or potassium ion. The substance can be added in any fashion including any conventional means. In other words, the substance can be added in the same manner that a carbon black yielding feedstock is introduced. The substance can be added as a gas, liquid, or solid, or any combination thereof. The substance can be added at one point or several points and can be added as a single stream or a plurality of streams. The substance can be mixed in with the feedstock, fuel, and/or oxidant prior to and/or during their introduction.

In certain embodiments, the substance containing at least one Group IA or Group IIA element is introduced into the feedstock by incorporation of a salt solution into the feedstock. In certain preferred embodiments, salt solutions are mixed with the feedstock such that the concentration of all alkali metal and/or alkaline metal ions in the feedstock is from about 0 to about 1 weight percent. Upon combustion, the metal ions can become incorporated into the carbon black. Without being bound by any particular theory, it is believed that the charge of metal ions provides a repulsive force between individual carbon black particles. This repulsive force may keep particles from aggregating, thus decreasing the overall structure of the carbon black.

The mixture of carbon black-yielding feedstock and hot combustion gases flows downstream through zone 12 into zone 18 and then into zone 19. Quench 60, located at point 62, injecting quenching fluid 50, which may be water, is utilized to stop the chemical reaction when carbon blacks are formed. Point 62 may be determined in any manner known to the art for selecting the position of a quench to stop pyrolysis. One method for determining the position of the quench to stop pyrolysis is by determining the point at which an acceptable Spectronic 20 value for the carbon black is reached. Q is the distance from the beginning of zone 18 to quench point 62, and will vary according to the position of quench 60. In some embodiments, reverse osmosis water is used as the quenching fluid to minimize the amount of additional metal and other elements that are added to the carbon black during quenching.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

In the furnace, the specific iodine number and DBP of the carbon black are controlled by simultaneously adjusting the burner natural gas rate, feedstock rate, potassium concentration, and auxiliary hydrocarbon rate and location to achieve the desired properties. The iodine number can be increased by increasing the burner natural gas rate, decreasing the feedstock rate, increasing the metal salt concentration, and/or decreasing the auxiliary hydrocarbon rate. The DBP can be increased by increasing the burner natural gas rate, increasing or decreasing the feedstock rate (depending on other factors), decreasing the metal salt concentration, and/or decreasing the auxiliary hydrocarbon rate. Where the auxiliary hydrocarbon is increased e.g., such that it provides more that 8% or 10% of the total carbon content in the reactor, it may be desirable to reduce the amount of feedstock in the reactor to maintain or increase the surface area of the resulting carbon black. Under these conditions, low structure might also be achieved with lower amounts of alkali or alkaline earth materials. The variables discussed herein also affect other characteristics of the carbon black such as tint, Spectronic 20 value, pH, M-ratio, and residual metal content. The exact levels of each variable required to create carbon black with the desired properties depend on the geometry of the reactor and the method of injection of each species into the reactor. Examples are described in more detail below.

We have unexpectedly found that certain conditions for introducing the auxiliary gas, including a decreased injection orifice diameter, increased feed rate, and injection of the auxiliary gas in the same axial plane as the carbon-black yielding feedstock, in combination with specific concentrations of alkali and/or alkaline earth elements in the feedstock, as well as specific diameters and lengths for the various combustion zones, enabled us to produce carbon blacks having both low structure and high surface area. The blacks are also more hydrophobic than would have been expected from the reaction conditions employed. The levels of structure are significantly lower than what can be achieved through the use of alkali or alkaline earth addition or auxiliary hydrocarbon alone. Furthermore, the carbon blacks have structures that are significantly lower, e.g., 20 cc/100 g to 45 cc/100 g, than what has been previously achievable for intermediate or high surface area blacks, e.g., 30-200 $m^2/g$. The amount of alkali or alkaline earth metals in the carbon black is lower than what is usually found for lower structure carbon blacks with intermediate to high surface area. The resulting carbon black has the low DBP that facilitates dispersion and reduces viscosity of media in which the carbon black is incorporated to ease manufacturing without a reduction in surface area, which can decrease optical density in devices produced from the carbon black. Furthermore, the low level of alkali and alkaline earth materials further allows low DBP blacks to be employed in electronic applications without sacrificing resistivity. The increased tint exhibited by these carbon blacks decreases the amount of carbon black that must be used in a carrier to achieve a desired optical density.

In some embodiments, the carbon black may be modified to attach an organic group to the surface, oxidized, or subjected to heat treatment. Carbon black may be heat treated in an inert atmosphere to increase the graphite content of the carbon black. One of skill in the art will recognize that the time and temperature of the heat treatment may be adjusted to achieve a desired amount of graphitization.

Oxidized carbon blacks are oxidized using an oxidizing agent in order to introduce polar, ionic, and/or ionizable groups onto the surface. Carbon blacks prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, carbon blacks prepared using other surface modification methods to introduce ionic or ionizable groups onto a pigment surface, such as chlorination and sulfonylation, may also be used.

Modified carbon blacks may be prepared using any method known to those skilled in the art such that organic chemical groups are attached to the carbon black. For example, the modified carbon black can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the carbon black compared to dispersant type methods, which use, for example, polymers and/or surfactants. Other methods for preparing the modified carbon black include reacting a carbon black having available functional groups with a reagent comprising the organic group, such as is described in, for example, U.S. Pat. No. 6,723,783, which is incorporated in its entirety by reference herein. Such a functional carbon black may be prepared using the methods described in the references incorporated above. In addition modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, *Polym. Sci.*, 17, 417, 1992, each of which is also incorporated in its entirety by reference herein.

The following testing procedures are used in evaluating the analytical and physical properties of the carbon blacks. Iodine adsorption number of the carbon blacks ($I_2$ No.) was determined according to ASTM Test Procedure D-1510-08. Tinting strength (Tint) of the carbon blacks was determined according to ASTM Test Procedure D3265-07. The DBP (dibutyl phthalate value) of the carbon blacks was determined according to the procedure set forth in ASTM D2414-08. Nitrogen surface area and STSA surface area were measured as per ASTM D6556-07. Ash content was measured as per ASTM D1506-99. The pH was determined by dispersing a known amount of carbon black in water and measuring the pH of the aqueous phase using a pH probe (ASTM D1512-05). Spectronic 20 was measured as per ASTM D1618-99. Na and K content were measured via inductively coupled plasma (ICP) analysis.

Figure 3:
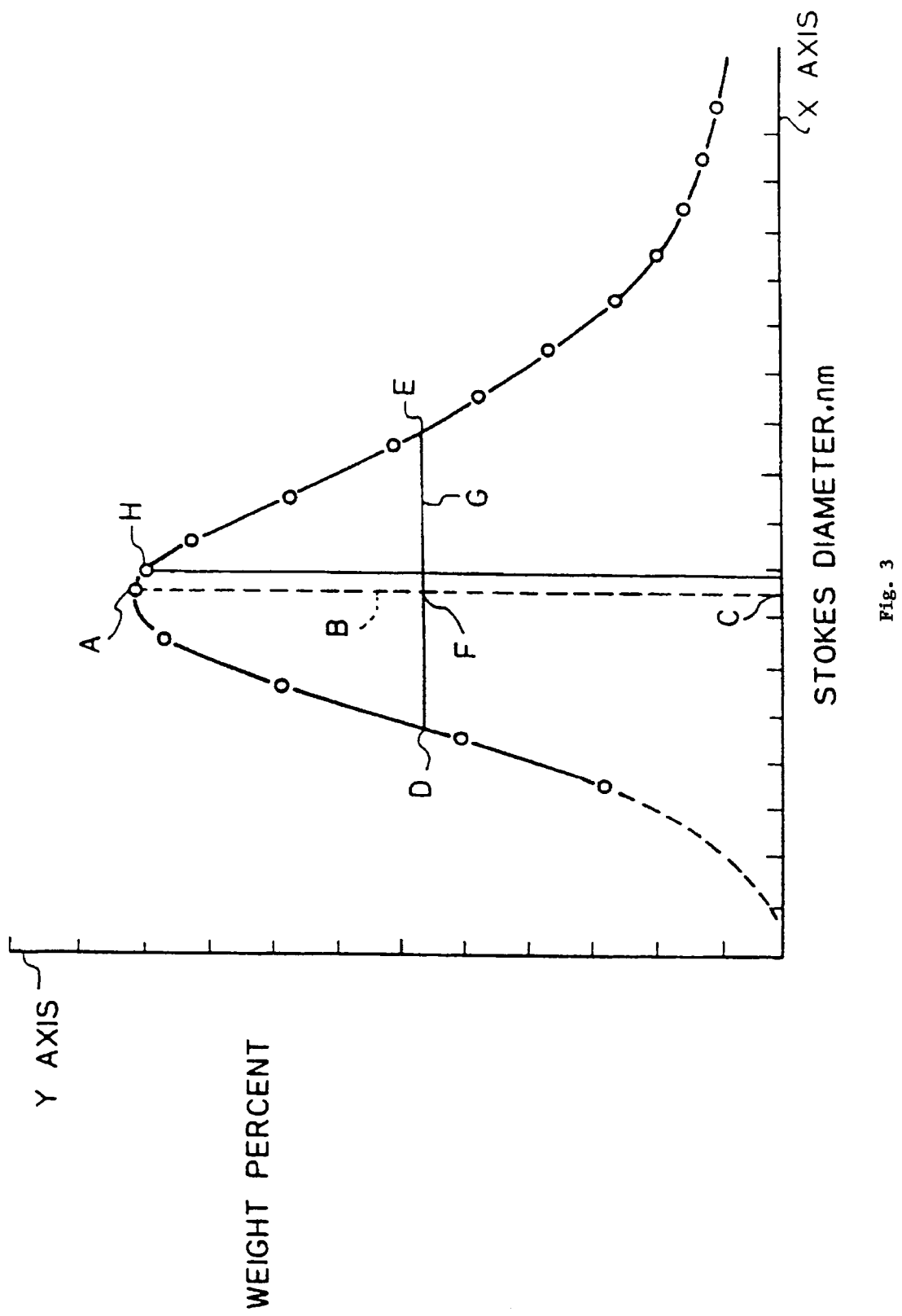
FIG. 3 is a sample histogram of the weight fraction of the aggregates of a carbon black sample versus the Stokes Diameter in a given sample.

The median and mode Stokes diameters were determined from a histogram of the weight fraction of carbon black versus the Stokes diameter of the carbon black aggregates, as shown in FIG. 3 and described in U.S. Pat. No. 5,456,750. Briefly, the data used to generate the histogram are determined by the use of a disk centrifuge such as the one manufactured by Joyce Loebl Co. Ltd. of Tyne and Wear, United Kingdom.

The following procedure is a modification of the procedure described in the instruction manual of the Joyce Loebl disk centrifuge file reference DCF 4.008 published on Feb. 1, 1985, the teachings of which are hereby incorporated by reference, and was used in determining the data. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disk speed, which in this instance is 8000 rpm;
7. The data sampling interval, which in this instance is 1 second. The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density, and rate of sedimentation as the object. The customary units are expressed in nanometer diameters.

Mode (Dmode for reporting purposes)—The Stokes diameter at the point of the peak (Point A of FIG. 3 herein) of the distribution curve for Stokes diameter.

Median Stokes diameter—(Dst for reporting purposes) the point on the distribution curve of Stokes diameter where 50% by weight of the sample is either larger or smaller. It therefore represents the median value of the determination.

The water spreading pressure was measured by observing the mass increase of a sample as it adsorbs water from a controlled atmosphere. In the test, the relative humidity (RH) of the atmosphere around the sample is increased from 0% (pure nitrogen) to ~100% (water-saturated nitrogen). If the sample and atmosphere are always in equilibrium, the water spreading pressure ($\pi_e$) of the sample is defined as:

$$\pi_e = \frac{RT}{A} \int_o^{P_o} \Gamma \, d\ln P$$

where R is the gas constant, T is the temperature, A is the nitrogen surface area of the sample, $\Gamma$ is the amount of adsorbed water on the sample (converted to moles/gm), P is the partial pressure of water in the atmosphere, and $P_o$ is the saturation vapor pressure in the atmosphere. In practice, the equilibrium adsorption of water on the surface is measured at one or (preferably) several discrete partial pressures and the integral is estimated by the area under the curve.

The following procedure may be used to measure the water spreading pressure. Before analysis, 100 mg of the carbon black to be analyzed is dried in an oven at 125° C. for 30 minutes. After ensuring that the incubator in a Surface Measurement Systems DVS1 instrument (supplied by SMS Instruments, Monarch Beach, Calif.) has been stable at 25° C. for 2 hours, sample cups are loaded in both the sample and reference chambers. The target RH is set to 0% for 10 minutes to dry the cups and to establish a stable mass baseline. After discharging static and taring the balance, approximately 8 mg of carbon black is added to the cup in the sample chamber. After sealing the sample chamber, the sample is allowed to equilibrate at 0% RH. After equilibration, the initial mass of the sample is recorded. The relative humidity of the nitrogen atmosphere is then increased sequentially to levels of approximately 5, 10, 20, 30, 40, 50, 60, 70, 78, 87, and 92% RH, with the system allowed to equilibrate for 20 minutes at each RH level. The mass of water adsorbed at each humidity level is recorded, from which water spreading pressure is calculated via the above equation.

The present invention will be further clarified by the following examples which are intended to be only exemplary in nature.

EXAMPLES

Preparation of Carbon Black

Carbon blacks were prepared in a reactor as described above and shown in FIG. 2, utilizing the reactor conditions and geometry set forth in Table 2. Natural gas was employed as both the fuel for the combustion reaction and the auxiliary hydrocarbon. An aqueous solution of potassium acetate was used as the alkali metal-containing material, and was mixed with the feedstock prior to injection into the reactor. The reaction was quenched with water purified by reverse osmosis. The liquid feedstock had the properties indicated in Table 1, below.

TABLE 1

| Feedstock Properties | |
|---|---|
| Hydrogen/Carbon Ratio | 0.91 |
| Hydrogen (wt %) | 6.97 |
| Carbon (wt %) | 91.64 |
| Sulfur (wt %) | 0.81 |
| Nitrogen (wt %) | 0.35 |
| Oxygen (wt %) | 0.23 |
| Specific Gravity at 60° F. [ASTM D-287] | 1.1029 |

TABLE 2

Reactor Geometry and Operating Conditions

| | Example No. | | | | |
|---|---|---|---|---|---|
| | A | B | C | D | E |
| D-1 (m) | 0.18 | 0.18 | 0.18 | 0.18 | 0.18 |
| D-2 (m) | 0.11 | 0.11 | 0.11 | 0.11 | 0.11 |
| D-3 (m) | 0.91 | 0.91 | 0.91 | 0.91 | 0.91 |
| D-4 (m) | 0.91 | 0.91 | 0.91 | 0.91 | 0.91 |
| D-5 (m) | 0.91 | 0.91 | 0.91 | 0.91 | 0.91 |
| D-6 (m) | 0.91 | 0.91 | 0.91 | 0.91 | 0.91 |
| D-7 (m) | 0.91 | 0.91 | 0.91 | 0.91 | 0.91 |
| L-1 (m) | 0.61 | 0.61 | 0.61 | 0.61 | 0.61 |
| L-2 (m) | 0.30 | 0.30 | 0.30 | 0.30 | 0.30 |
| L-3 (m) | 0.23 | 0.23 | 0.23 | 0.23 | 0.23 |
| L-4 (m) | 0 | 0 | 0 | 0 | 0 |
| L-5 (m) | 0 | 0 | 0 | 0 | 0 |
| L-6 (m) | 0 | 0 | 0 | 0 | 0 |
| L-7 (m) | 0 | 0 | 0 | 0 | 0 |
| Q (m) | 5.0 | 5.0 | 4.0 | 4.0 | 4.0 |
| Combustion Air ($nm^3/h$) | 1600 | 1600 | 1600 | 1600 | 1600 |
| Combustion Air Preheat (K) | 753 | 753 | 753 | 753 | 753 |
| Burner Nat. Gas ($nm^3/h$) | 42 | 42 | 42 | 42 | 42 |
| Feedstock Injection Orifice Diameter (cm) | 0.198 | 0.208 | 0.150 | 0.170 | 0.170 |
| No. Feedstock Injection Orifices | 3 | 3 | 3 | 3 | 3 |
| Feedstock Rate ($10^4 \times m^3/s$) | 1.55 | 1.68 | 1.11 | 1.40 | 1.30 |
| Feedstock Temp. (K) | 448 | 443 | 453 | 448 | 468 |
| $K^+$ Concentration in feedstock ($g/m^3$) | 274 | 236 | 734 | 780 | 485 |
| Aux. HC Injection Orifice Diameter (cm) | 0.508 | 0.508 | 0.508 | 0.508 | 0.508 |
| No. Aux. HC Injection Orifices* | 3 | 3 | 3 | 3 | 3 |
| Aux. HC Rate ($nm^3/h$)** | 30 | 32 | 22 | 27 | 50 |
| Primary Combustion (%)*** | 400 | 400 | 400 | 400 | 400 |
| Overall Combustion (%)**** | 25.8 | 23.7 | 34.6 | 28.3 | 28.9 |
| Quench Water Rate (kg/h) | 510 | 510 | 520 | 548 | 580 |

*The feedstock and auxiliary hydrocarbon orifices were arranged in the same axial plane in an alternating sequence around the periphery of the reactor. HC = hydrocarbon
**$nm^3$ refers to normal cubic meters, where "normal" refers to the gas volume corrected to 0° C. and 1 atm pressure
***Primary combustion is defined as the percentage of oxygen added to the reactor compared to the total amount of oxygen required to stoichiometrically react with the burner natural gas.
****Overall combustion is defined as the percentage of oxygen added to the reactor compared to the total amount of oxygen required to stoichiometrically react with all the fuel streams added to the reactor.

Characterization of Carbon Blacks

Various properties of carbon blacks produced in Example 1 were measured as described elsewhere herein. The pH values shown were determined by dispersing 3 g of the material in 30 mL of water, boiling for 15 minutes, cooling to room temperature, and measuring the pH of the aqueous phase with a pH probe (ASTM D1512-05). As shown in Table 3, below, the carbon blacks exhibit low structure, high purity (low extractables and low [$K^+$]), neutral to mildly basic pH, and low WSP (e.g, the carbon blacks are hydrophobic).

TABLE 3

| | Example No. | | | | |
|---|---|---|---|---|---|
| | A | B | C | D | E |
| Iodine Number (mg/g) | 47 | 33 | 123 | 73 | 69 |
| DBP (cc/100 g) | 35 | 32 | 37 | 35 | 37 |
| Nitrogen Surface Area ($m^2/g$) | 42 | | 105 | 62 | 63 |
| STSA Surface Area ($m^2/g$) | 41 | 31 | 104 | 61 | 63 |
| Tint (%) | 87 | | 123 | 103 | 105 |
| Spectronic 20 (%) | 99.5 | 75 | | 98 | 98.5 |
| Boiled pH | 6.6 | | 8.8 | 7.9 | 9.2 |
| D-Mode (nm) | 84 | | | 69 | 72 |
| D-Stokes (nm)* | 103 | | | 80 | 86 |
| Na content (μg/g) | 7.3 | | | | |
| K content (μg/g) | 434.1 | | 1378 | 1221 | 927 |
| Ash content (wt %) | 0.19 | | | | |
| WSP ($mJ/m^2$) | 3.0 | | 4.5 | 3.9 | 4.9 |

*Median Stokes diameter

Preparation of Millbases

The carbon blacks of Example A and a commercially available carbon black having the characteristics listed in Table 4, below, were used to prepare millbases with the compositions described in Table 5 below.

TABLE 4

Comparative Carbon Black Analytical Properties

| | Example No. C1 |
|---|---|
| Iodine Number (mg/g) | 71 |
| DBP (cc/100 g) | 46 |
| Nitrogen Surface Area ($m^2/g$) | 66 |
| STSA Surface Area ($m^2/g$) | 66 |
| Tint (%) | 104 |
| Spectronic 20 (%) | 99 |
| Boiled pH | 7.6 |
| D-Mode (nm) | 77 |
| D-Stokes (nm)* | 87 |
| Na content (μg/g) | 191 |
| K content (μg/g) | 999 |
| Ash content (wt %) | 0.38 |
| WSP ($mJ/m^2$) | 8.0 |

*Median Stokes diameter

TABLE 5

| | Example No. | |
|---|---|---|
| | A | C1 |
| Amt of pigment (g) | 15 | 15 |
| Amt of Solsperse 32500 (g) (40% solution) | 7.5 | 7.5 |
| Amt of PGMEA (g) | 52.5 | 52.5 |

Solsperse 32500 is a polymeric dispersant commercially available from Noveon, and PGMEA is propylene glycol methyl ether acetate available from Sigma-Aldrich.

The components were milled using a Skandex lab shaker for 4 hours. The mean volume particle size of the pigments in the millbases were measured and found to be comparable to the aggregate size of base carbon black.

Preparation of Letdowns

Each of the millbases of described above were letdown with a 20 wt % solution of Joncryl 611 (commercially available from Johnson Polymers) in PGMEA to prepare coating compositions containing 50% carbon black by weight on a solvent-free basis.

Preparation of Coatings

The coating compositions described above were spin coated onto glass wafers to form coatings, and the properties of these coatings were measured. Optical density was measured using an X-Rite 361T Transmission Densitometer, and the thickness was measured using a KLA Tencor Alpha Step 500 Surface Profilometer. The surface resistivity of the coatings was measured using a Keithley Model 6517 Electrometer/High Resistance Meter. Performance properties of each of the coatings are shown in Table 6 below.

TABLE 6

| Example No. | OD at 1 μm | Surface Resistivity, Ω/square |
|---|---|---|
| A | 3.6 | 2.2E+13 |
| C1 | 3.64 | 5.05E+13 |

While these examples use a resin that is not curable, it would be expected that similar performance would result if a curable resin, such as a photosensitive or thermosensitive resin, were used. Therefore, these coatings could be used as a black matrix.

Viscosity

The carbon blacks of Example A and Comparative Example C1 were used to prepare millbases with from 10 to 50 wt % carbon black in PGMEA. The millbases also included a dispersant (Solsperse 32500). The ratio between the dispersant and the carbon black was fixed at 0.2. The components were milled using a Skandex lab shaker for 4 hours. The mean volume particle size of the pigments in the millbases were measured and found to be comparable to the aggregate size of base carbon black.

Viscosity measurements were conducted for millbase formulations using cuvette geometry and an AR-G2 (TA Instruments) rheometer.

Figure 4:
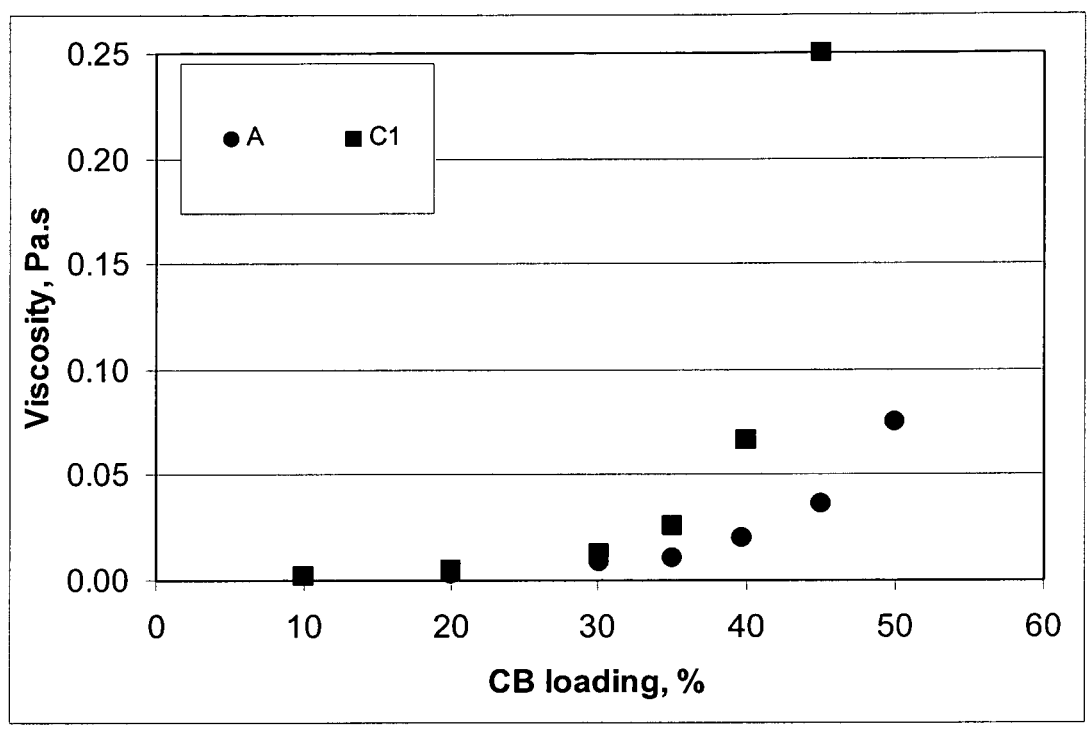
FIG. 4 is a graph showing the viscosity of millbases produced using a carbon black according to an exemplary embodiment of the invention and a commercially available carbon black.

The millbase dispersions were Newtonian fluids. At 50% loading, the dispersion with Carbon Black C1 exhibited non-Newtonian behavior, whereas the dispersion with Carbon Black A was Newtonian in the entire range of carbon black concentrations studied. A key advantage of low DBP carbon black is significantly lower viscosity, especially at higher carbon black loadings (see FIG. 4), which is beneficial for processing (for instance, by spin coating), and film properties (for example, film smoothness resulting from to better leveling off of a lower viscosity coating).

Percolation Curve

The carbon black of Example A and Comparative Example C1 were used to prepare millbases, letdowns, and coatings according to the procedures described above and containing 40%, 50%, 60%, 70% carbon black by weight on a solvent-free basis. The surface resistivity of the coatings was measured as above and is illustrated in FIG. 3. FIG. 3 shows that, using lower structure blacks, loading levels can be increased without either lowering resistivity or creating high sensitivity of the surface resistivity to loading level.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A black matrix comprising at least a first carbon black, the first carbon black having an $I_2$ number from 30 mg/g to 200 mg/g, a DBP from 20 cc/100 g to 39 cc/100 g, an M-ratio of from 1 to less than 1.24 and a concentration of Group IA and IIA elements, in μg/g, of at most y+(15*$I_2$ number), wherein y is 250.

2. The black matrix of claim 1, wherein the first carbon black is characterized by at least one of the following:
   the carbon black has an M-ratio of from 1 to less than 1.22,
   the carbon black has a pH from 6 to 10,
   the carbon black has a water spreading pressure of at most 6 mJ/m$^2$,
   the carbon black has a tint obeying the equation tint=x+ 0.44*$I_2$ number, where x is from 45 to 90, or
   the carbon black has a tint of at least 80.

3. The black matrix of claim 1, wherein the black matrix has an optical density of at least 3 at a 1 micron thickness.

4. The black matrix of claim 1, wherein the black matrix has a surface resistivity of at least 10$^{12}$ ohm/square at a carbon black loading of at least 60%.

5. The black matrix of claim 1, wherein the black matrix comprises a second carbon black.

6. The black matrix of claim 5, wherein the second carbon black differs from the first carbon black in one or more of surface area, structure, primary particle size, alkali and/or alkaline earth concentration, pH, Spectronic 20 value, tint, or a surface concentration of oxygen-containing groups.

7. The black matrix of claim 5, wherein the second carbon black is an oxidized carbon black, a heat treated carbon black, or a modified carbon black comprising an attached organic group.

* * * * *